United States Patent
Möllmann et al.

(10) Patent No.: US 12,297,059 B2
(45) Date of Patent: May 13, 2025

(54) LOADING SYSTEM FOR LOADING AND UNLOADING TRUCKS WITH PALLETS IN TRANSVERSE DIRECTION

(71) Applicant: TRAPO AG, Gescher-Hochmoor (DE)

(72) Inventors: Erik Möllmann, Rhede (DE); Tobias Niehaves, Bocholt (DE); Volker Kugel, Beckum (DE); Stefan Kurtenbach, Schermbeck (DE); Jascha Paris, Münster (DE)

(73) Assignee: TRAPO AG, Gescher-Hochmoor (DE)

( * ) Notice: Subject to any disclaimer, the term of this patent is extended or adjusted under 35 U.S.C. 154(b) by 334 days.

(21) Appl. No.: 17/771,787

(22) PCT Filed: Jul. 22, 2020

(86) PCT No.: PCT/EP2020/070710
§ 371 (c)(1),
(2) Date: Apr. 25, 2022

(87) PCT Pub. No.: WO2021/078418
PCT Pub. Date: Apr. 29, 2021

(65) Prior Publication Data
US 2022/0371836 A1    Nov. 24, 2022

(30) Foreign Application Priority Data

Oct. 25, 2019   (DE) .................... 20 2019 106 718.7
Dec. 17, 2019   (DE) .................... 10 2019 134 787.4

(51) Int. Cl.
B65G 67/08    (2006.01)
B65G 67/20    (2006.01)
B65G 67/24    (2006.01)

(52) U.S. Cl.
CPC ............. *B65G 67/08* (2013.01); *B65G 67/20* (2013.01); *B65G 67/24* (2013.01)

(58) Field of Classification Search
CPC ......... B65G 67/08; B65G 67/20; B65G 67/24
See application file for complete search history.

(56) References Cited

U.S. PATENT DOCUMENTS

| | | |
|---|---|---|
| 4,508,484 A | 4/1985 | Heiz |
| 4,832,559 A | 5/1989 | Gebbardt |

(Continued)

FOREIGN PATENT DOCUMENTS

| | | |
|---|---|---|
| DE | 26 10 070 A1 | 9/1977 |
| DE | 3709835 A1 | 10/1988 |
| DE | 19539563 A1 | 4/1996 |
| EP | 1 946 963 A1 | 7/2008 |
| EP | 2 354 004 A1 | 8/2011 |
| JP | 60-31445 A | 2/1985 |
| JP | 2018-043879 A | 3/2018 |
| WO | 2019/145403 A1 | 8/2019 |

OTHER PUBLICATIONS

Machine Translation of DE 19539563 from espacenet. (Year: 1996).*

(Continued)

*Primary Examiner* — Mark C Hageman
(74) *Attorney, Agent, or Firm* — Keating & Bennett, LLP

(57) ABSTRACT

A loading system for loading and unloading cargo compartments of trucks includes conveyors positioned parallel or substantially parallel to one another and such that standard pallets can be moved back and forth on the conveyors in a conveying direction, and an autonomous conveyor vehicle. The conveyors are positioned at a height above a floor such that the conveyor vehicle with vertically movable pallet fork assemblies can be positioned below the conveyors.

12 Claims, 7 Drawing Sheets

(56) References Cited

U.S. PATENT DOCUMENTS

| | | | | |
|---|---|---|---|---|
| 4,941,794 | A * | 7/1990 | Hara | B65G 67/20 |
| | | | | 280/43.12 |
| 5,391,038 | A * | 2/1995 | Stewart | B65G 67/02 |
| | | | | 414/398 |
| 6,368,042 | B1 * | 4/2002 | Gagnon | B66F 9/06 |
| | | | | 180/401 |
| 8,251,634 | B2 * | 8/2012 | Kauhanen | B65G 67/20 |
| | | | | 414/389 |
| 10,099,872 | B2 * | 10/2018 | Auvinen | B65G 67/02 |
| 10,781,061 | B2 * | 9/2020 | Huang | B65G 67/20 |
| 10,981,486 | B2 * | 4/2021 | Carpenter | B65G 67/08 |
| 11,059,684 | B2 * | 7/2021 | Pakkanen | B65G 67/20 |
| 2005/0053451 | A1 | 3/2005 | Gagnon et al. | |

OTHER PUBLICATIONS

Official Communication issued in International Patent Application No. PCT/EP2020/070710, issued on Apr. 26, 2022.

English translation of Official Communication issued in International Patent Application No. PCT/EP2020/070710, mailed on Oct. 20, 2020.

Official Communication issued in International Patent Application No. PCT/EP2020/070710, mailed on Oct. 20, 2020.

* cited by examiner

LOADING SYSTEM FOR LOADING AND UNLOADING TRUCKS WITH PALLETS IN TRANSVERSE DIRECTION

CROSS REFERENCE TO RELATED APPLICATIONS

This application claims the benefit of priority to German Patent Application No. 202019106718.7 filed on Oct. 25, 2019 and German Patent Application No. 102019134787.4 filed on Dec. 17, 2019. The entire contents of these applications are hereby incorporated herein by reference.

BACKGROUND OF THE INVENTION

1. Field of the Invention

The present invention relates to a loading system for loading and unloading cargo compartments of trucks.

2. Description of the Related Art

In logistics, the aim is to shorten the downtimes of trucks during loading and unloading by transporting goods on pallets as quickly as possible from a warehouse into the truck's hold. In the present context, truck means the loading space of a truck, which can be designed, for example, as a semitrailer of an articulated truck, as a skip or as a container. For loading and unloading, trucks are usually driven backwards with the rear opening of the loading space to a ramp, where pallets are then provided and transported into the loading space.

One way of loading is to transfer pallets individually into the truck using pallet trucks or forklifts. Rectangular pallets with uniform dimensions, for example pallets whose short sides are about 0.8 m and whose long sides are about 1.2 m, are placed next to each other either lengthwise or crosswise. In the case of Euro pallets, three pallets can be placed next to each other lengthwise, i.e., with their narrow sides facing in the direction of travel of the truck, or two pallets can be placed next to each other crosswise, i.e., with their long sides facing in the direction of travel of the truck.

German Patent DE 3709835 C2 describes a loading and unloading station for trucks and containers, in which pallets are placed in rows of three pallets next to each other on a chain conveyor corresponding to the dimensions of the load compartment floor until the entire load of the truck is provided on the chain conveyor. The chain conveyor is then moved all the way into the hold, resting on the floor of the truck. The chain conveyor is then started to move the load forward in the direction of travel of the truck, depositing the front row of pallets at a time. Simultaneously, the chain conveyor is moved backward out of the cargo area at the same speed that the pallets are moved forward on the chain conveyor. As a result, the pallets essentially do not move relative to the loading space and are deposited there one row at a time until the chain conveyor is completely out of the loading space and the last row of pallets has been deposited on the floor of the loading space. In this system, the entire load of the truck is placed on the chain conveyor before the loading process begins. Accordingly, the space required by this system at the ramp of the logistics warehouse is relatively large, and loading the chain conveyor into the truck's loading space before the loading process begins is time-consuming, since loading of the chain conveyor must be completed before the pallets can be moved into the loading space.

From European Patent Application Publication Number EP 1 946 963 A1 a trailer of a truck is known, which is equipped at the bottom of its loading space with chain conveyors arranged parallel in longitudinal direction of the trailer. In this case, the chain conveyors are arranged in such a way that a total of three pallets can stand next to each other on the conveyors. For loading, three pallets side by side are placed on the floor of the loading space at the rear and then conveyed forward by the chain conveyor installed in the trailer until the entire loading space is filled. For unloading, the pallets can then be transported back to the opening of the loading space using the chain conveyor and removed there using a forklift truck. This system requires the respective trailer to be equipped with its own chain conveyor, which extends over the entire length of the loading space and has its own drive. The system is correspondingly complex.

SUMMARY OF THE INVENTION

Accordingly, preferred embodiments of the present invention provide systems for loading and unloading cargo spaces of trucks that are more flexible in handling, that can be implemented without any modifications to the cargo space, and that require less space in the ramp area of the logistics warehouse.

Because in a loading system for loading and unloading cargo compartments of trucks, with an arrangement of conveyors which are positioned parallel or substantially parallel to one another and such that standard pallets can be moved back and forth on the conveyors in a conveying direction, there is further provided an autonomous self-propelled conveyor vehicle with at least one steerable wheel as a component of the loading system, and the conveyors are positioned at a height above a floor such that the conveyor vehicle with vertically movable pallet fork assemblies can be positioned below the conveyors, pallets standing on the conveyors can be lifted via the pallet fork assemblies and moved into the loading space of a waiting truck.

The underside of standard pallets is designed in such a way that a total of nine cuboid blocks are arranged underneath the load-bearing platform, three on each side and three in the middle. The three blocks are connected at the bottom with three ledges in the longitudinal direction of the pallet. In the longitudinal direction, this results in open spaces at the bottom into which pallet forks can engage from below. Viewed in the transverse direction of the pallet, the ledges limit the openings resulting between the blocks downward, so that pallet forks cannot be inserted into these openings from below, but only from the side. Preferably, therefore, the conveyors are of such a length that they project in the conveying direction at least one pallet width, i.e. at least about 0.8 m, beyond the free ends of the pallet fork units when the conveyor vehicle is in a rest position below the conveyors. In this way, pallets can also be picked up where the pallet forks have to be inserted from the side into openings closed all around in order to be able to set the pallets down on a level floor.

If the conveyor vehicle includes at least two pallet fork assemblies, each with two parallel and spaced pallet forks, two pallets aligned in the transverse direction can be picked up and transported simultaneously in a row next to each other.

Preferably, the loading system includes a total of six parallel conveyors in the form of chain conveyors in three pairs, and one adjacent pair of the conveyors is spaced apart by about 0.5 m to about 0.7 m. This arrangement of conveyors can carry and convey both two transversely aligned pallets and three longitudinally aligned pallets.

In a simplified preferred embodiment capable of handling only transversely oriented pallets, the loading system includes a total of four parallel conveyors in the form of chain conveyors in two pairs, and one adjacent pair of the conveyors is spaced apart by about 0.8 m to about 1.2 m.

If a feed area is provided upstream of the conveyors in the conveying direction, a number of pallets can be deposited there and, if necessary, aligned before these pallets are transferred to the chain conveyor. The infeed area preferably includes a roller conveyor 30 (labeled in FIG. 3) with rollers with axes of rotation aligned transverse to the conveying direction. For this purpose, it is advantageous if the rollers can be braked and driven at least in part. It is also advantageous to provide an alignment aid parallel to the rollers.

In a preferred embodiment of the present invention, the roller conveyor includes chain conveyors operating transversely to the conveying direction, which are set up to move the pallets on the roller conveyor and can be raised and lowered vertically. In this way, the pallets can be moved closer together and aligned precisely with the downstream chain conveyors in the transverse direction.

Advantageously, measuring columns with sensors are provided to measure a loading space opening that is not part of the loading system so that data on the relative positioning of the loading space opening to the loading system can be determined.

It is further provided that the conveyor vehicle carries a drive, at least one steered wheel and preferably also a counterweight on the side facing away from the pallet fork assemblies. This allows the weight of the pallets to be balanced during operation so that no support wheels are required below the pallet forks and the pallet forks can be freely lowered to the ground.

It is also advantageous if at least the inner pallet forks are displaceable in the horizontal direction transverse to the conveying direction. The spacing of the pallet forks can then be adapted to the spacing of the openings, in particular in the long sides of the pallets.

The conveyor vehicle preferably includes at least one drive, at least one lifter and a controller that enable autonomous driving of the conveyor vehicle as well as picking up, transporting and setting down of the load. For this purpose, the conveyor vehicle itself is preferably equipped with sensors for navigation within a loading space.

For largely autonomous operation, it is advantageous if the conveyor vehicle includes an accumulator to supply power to the drive, the lifter and the controller, which can be electrically charged via an electric coupling or inductively in the loading system. Preferably, charging takes place in a rest position below the chain conveyors.

A particularly high level of operational safety with reduced risk of collision between the pallets and the conveyor vehicle is achieved if the conveyor vehicle does not project upwards beyond the chain conveyors in a rest or standby position with the pallet fork assemblies lowered.

In a preferred embodiment of the present invention, the loading system is mounted on a base plate which, on the one hand, ensures the exact alignment of the components to each other, but which, on the other hand, can itself be mounted on rollers or on a rail system 31 (labeled in FIG. 8) so as to be movable transversely to the conveying direction. This makes it possible to move the loading system within a logistics building parallel to the ramp to various adjacent gates.

The above and other elements, features, steps, characteristics and advantages of the present invention will become more apparent from the following detailed description of the preferred embodiments with reference to the attached drawings.

BRIEF DESCRIPTION OF THE DRAWINGS

In the following, preferred embodiments of the present invention are described in more detail with reference to the drawing.

DETAILED DESCRIPTION OF THE PREFERRED EMBODIMENTS

Figure 1:
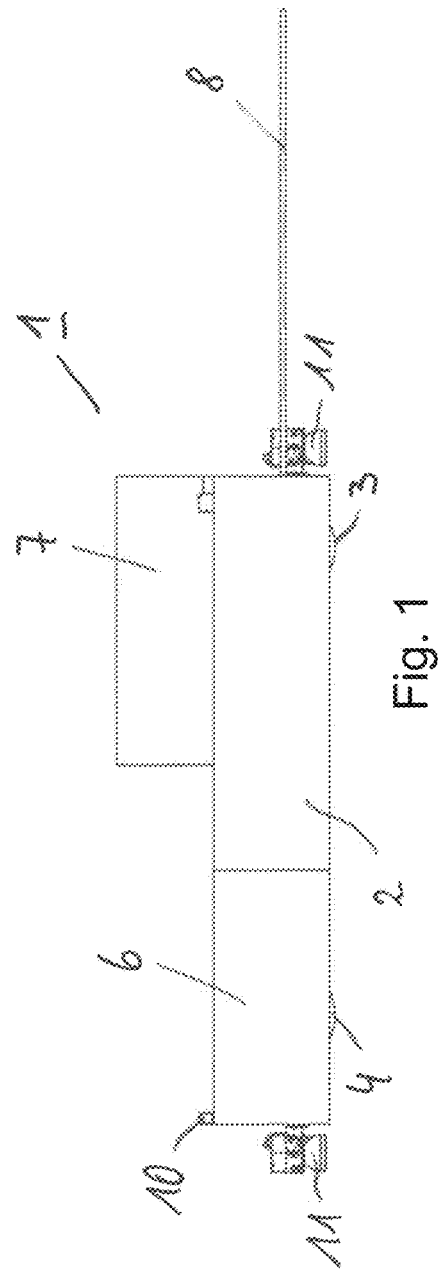
FIG. 1 shows a self-propelled conveyor vehicle for a loading system in a side view with lowered pallet fork units.

FIG. 1 shows a side view of a self-propelled conveyor vehicle 1 as part of the loading system to be described here. The conveyor vehicle 1 has a chassis 2 with support rollers 3 and steered drive wheels 4. The steered drive wheels 4 are arranged on a drive block 6. The drive block 6 includes the elements not shown here for control, drive and batteries for energy storage for the operation of the conveyor vehicle 1 and, if necessary, stabilizing weights. In addition, the drive block 6 carries a number of lifting units 7 which are connected to pallet fork units 8 and which are arranged to raise and lower the pallet fork units 8 in response to a control system, together with any load thereon. The pallet fork units 8 are shown in FIG. 1 in a lowered condition. The height of the upper side of the pallet fork units 8 above the contact surface corresponds at most to the clear height under a standard pallet for logistics. The support wheels 3 are arranged below the lifting units 7, as far as possible in the direction of the pallet fork units 8.

The conveyor vehicle 1 is also equipped with sensors 10 and additional safety sensors 11, which provide the necessary information for the autonomous navigation of the conveyor vehicle 1. Furthermore, a coupling is provided on the rear side in the direction of travel, which is used to charge the energy storage device when the conveyor vehicle 1 is docked to the loading system in the rest position.

Figure 2:
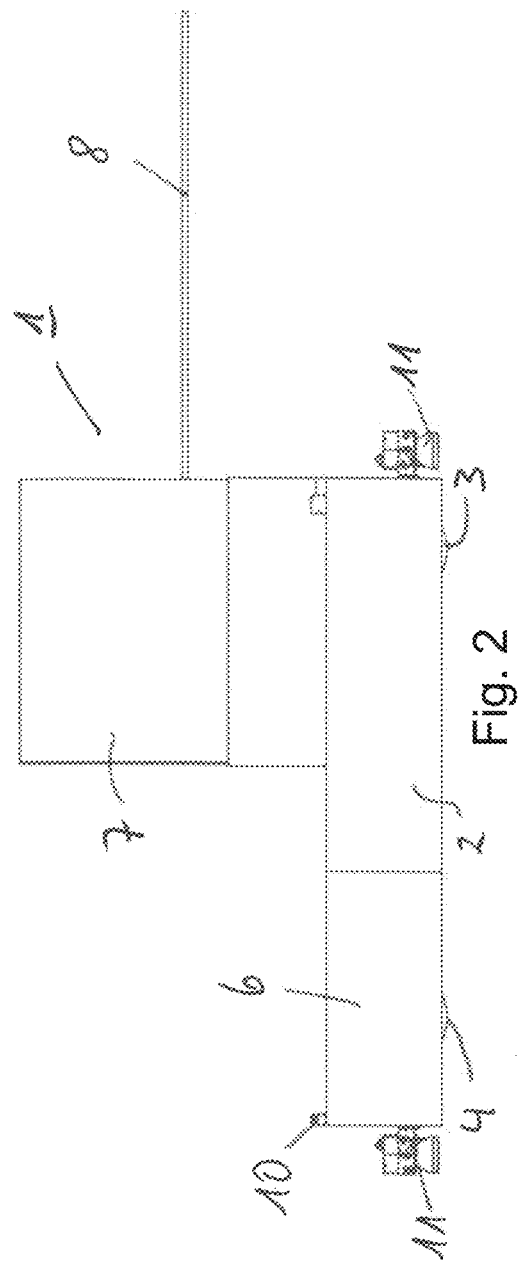
FIG. 2 shows the conveyor vehicle from FIG. 1 with the pallet fork units raised.

In FIG. 2, the conveyor vehicle 1 is shown in a view corresponding to FIG. 1. In FIG. 2, the lifting units 7 are raised together with the pallet fork units 8 attached to them.

Figure 3:
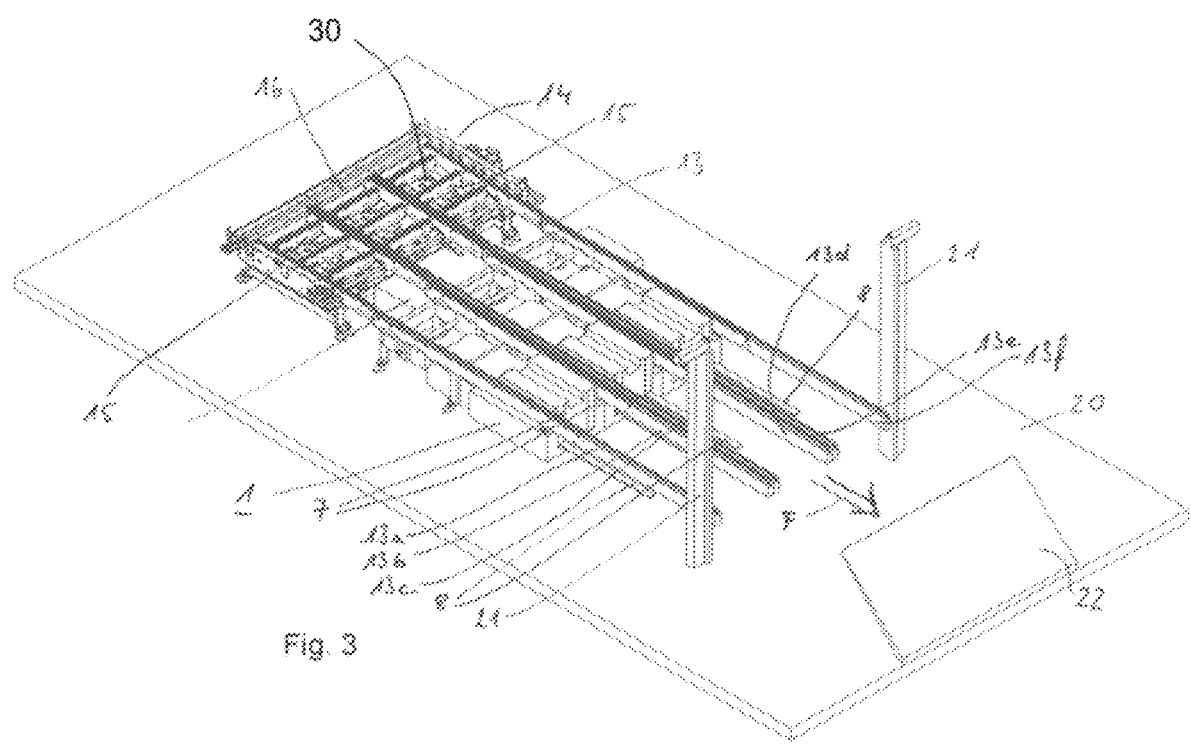
FIG. 3 shows perspective views of the loading system with the conveyor vehicle in the rest position.

FIG. 3 shows a perspective view of an example of a loading system at rest. The loading system comprises the conveyor vehicle 1 and a chain conveyor arrangement 13 with a number of chain conveyors 13a to 13f. A conveying direction F is indicated by an arrow in FIG. 3. For loading trucks, the load is conveyed in conveying direction F, and for unloading a truck, the load is conveyed against conveying direction F.

The chain conveyor arrangement 13 has a feed area 14 in which a rear alignment aid 16 is provided transverse to the conveying direction F, which can preferably be raised and lowered during operation. Furthermore, at least two, but preferably three vertically movable chain conveyors 15 are integrated in the feed area 14 in order to be able to regulate the distance between the pallets and to realize a second conveying direction transverse to the conveying direction F.

The chain conveyors 13a to 13f are arranged downstream of the feed area 14 in conveying direction F. Their orientation is chosen such that they can be driven parallel to the conveying direction F in both directions. In detail, a total of six individual conveyor chains 13a to 13f are provided, of which the conveyor chains 13a and 13b are spaced between 0.5 m and 0.7 m apart, so that the total width of the two chain conveyors corresponds to the width of a standard pallet. The conveyor chain 13c is arranged immediately adjacent to the conveyor chain 13b. The distance between the conveyor chains 13c and 13d again corresponds to the width of a standard pallet. The conveyor chain 13e is arranged directly next to the conveyor chain 13d. Finally, the distance between the conveyor chains 13e and 13f again corresponds to the width of a standard pallet. In total, therefore, three pallets can be placed on the chain conveyor 13 in the longitudinal direction and transported there in parallel at the same time. However, the conveyor chains arranged in this way also allow two pallets loaded in the transverse direction to be carried.

The conveyor vehicle 1 is shown in the rest position below the chain conveyor 13. In this perspective view, it can be seen that the conveyor vehicle 1 consists of a total of three modules, each of which has its own pallet fork unit 8 and two lifting modules 7 assigned to the pallet fork unit 8. Not all pallet forks are shown here.

The loading system is arranged on a floor, in this case in the form of a base plate 20, which supports a measuring column 21 on the right and left respectively (as seen in the direction of conveyance F). The measuring columns 21 are provided with a number of sensors, not shown in more detail, and are set up to measure the exact position of the loading bay opening as soon as a truck has approached the ramp. Further, the base plate 20 carries a flap 22 which can be folded down in the conveying direction F during operation as soon as a loading space opening is ready. The flap 22 bridges a distance and, if necessary, a height difference between the loading space opening and the base plate 20.

Figure 4:
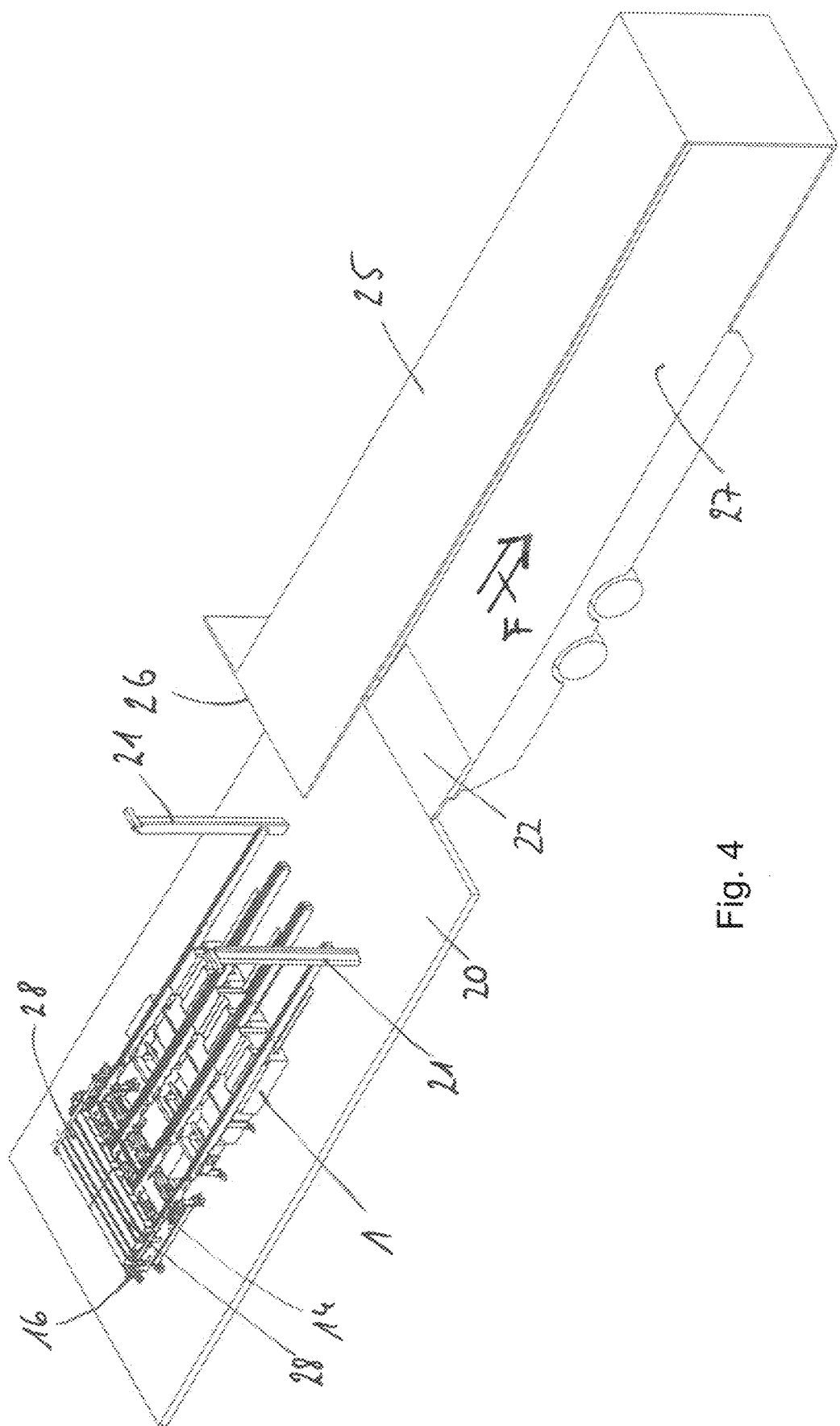
FIG. 4 shows the loading system of FIG. 3 with a row of two pallets put in place and a semi-trailer having approached the loading system with the loading space opening.

FIG. 4 shows the situation already indicated above, in which a semitrailer 25 of a truck with a loading space opening 26 has been driven up to a ramp (not shown) of a storage building. The flap 22 is folded down and rests on a loading space floor 27 of the semitrailer 25. In contrast to FIG. 3, the loading process has already begun. For this purpose, two pallets 28 have been placed on the feed area 14 parallel to each other. For alignment in the conveying direction F, the pallets 28 can be moved backwards against the alignment aid 16. The two pallets 28 form a row which is to be conveyed into the loading area of the trailer 25.

Figure 5:
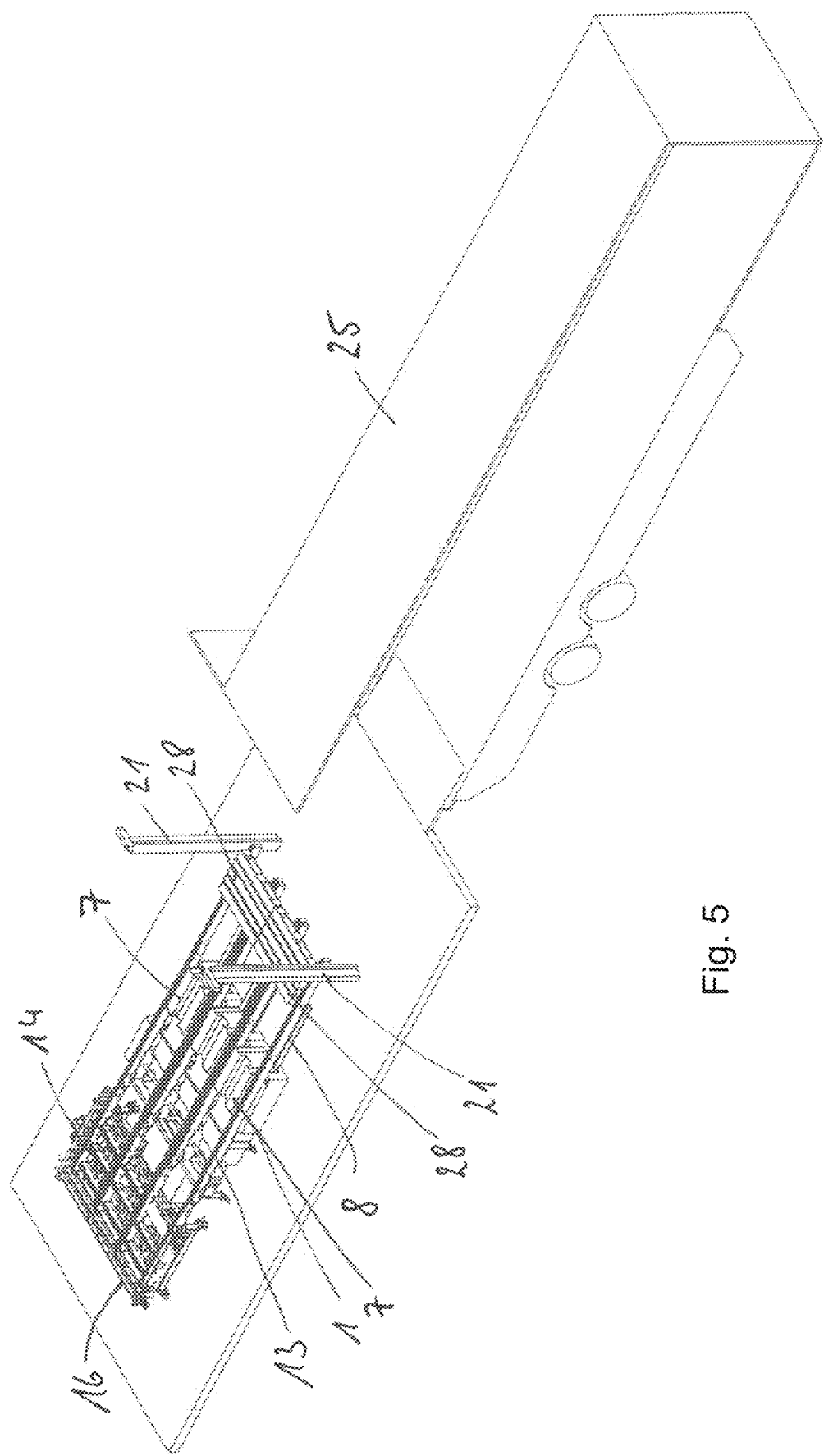
FIG. 5 shows the loading system from FIG. 4, where the row of pallets has been moved towards the trailer.

The next step is shown in FIG. 5. Here, the pallets 28 have first been conveyed forward from the feed area 14 in the conveying direction F on the chain conveyor 13, on which one pallet 28 at a time is positioned in transverse orientation as described above on a total of three spaced chain conveyors. The chain conveyor 13, in turn, has conveyed the pallets 28 in the conveying direction F to such an extent that they have been moved beyond the pallet fork units 8 of the conveyor vehicle 1.

The positioning of the pallets 28 on the chain conveyor 13 now allows the pallet fork units 8 of the conveyor vehicle 1 to be lifted by means of the lifting units 7. The pallet fork units 8 can be adjusted transversely to the conveying direction F and are set in such a way that they fit into the openings on the longitudinal side on the underside of the pallets 28 and, accordingly, also between the respective spaced-apart chain conveyors on which the pallets 28 are standing.

The conveyor vehicle 1 can thus insert the pallet forks 8 into the lateral openings of the pallets 28 and lift the two pallets 28 off the chain conveyors 13a to 13f by means of the pallet fork units 8. It then carries the load of the two pallets 28 standing next to each other, which are shown here without the goods being transported on them for the sake of clarity.

Before the conveyor vehicle 1 now autonomously moves off in conveying direction F with the pallets 28 carried by the pallet fork units 8, the sensors of the measuring columns 21 measure the loading space opening 26 and determine the exact position in the transverse direction and in the vertical direction. This information is transmitted to a control system of the conveyor vehicle 1, which is not shown, which can then approach the loading space opening 26 in an aimed manner. For this purpose, the steerable drive wheels 4 shown in FIG. 1 are provided, which can steer the conveyor vehicle 1 precisely into the loading space opening 26.

Figure 6:
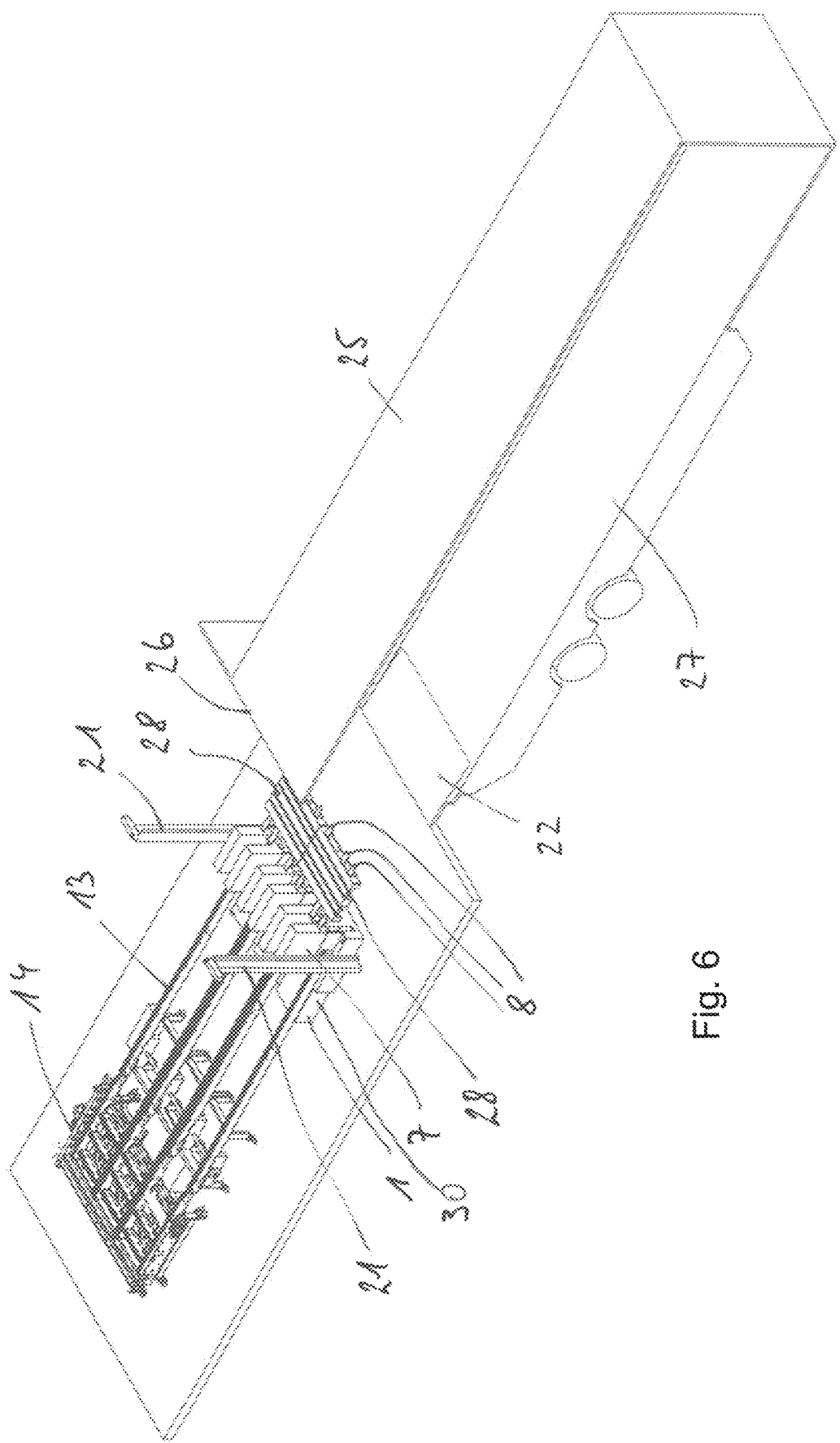
FIG. 6 shows the loading system of FIG. 4 and FIG. 5, in which the pallets have been lifted from the conveyor vehicle and removed from the chain conveyors and moved towards the loading space opening.

FIG. 6 illustrates how the conveyor vehicle 1 moves with the pallets 28 removed from the chain conveyors 13 in the direction of the loading space opening 26. The pallet fork units 8 are still raised here. It can be seen that the total of six pallet forks 8 have been adjusted in the transverse direction so that two pallet forks 8 each have been inserted into the two outer openings of the pallets 28, while only one pallet fork 8 each engages in the two inner openings.

Before they are moved into the loading area opening 26, the pallet fork units 8 are lowered so that even pallets loaded to the intended maximum height can be moved safely into the loading area opening 26 without hitting the upper edge. In the process, the pallet fork units 8 are lowered to such an extent that the pallets do not yet come into contact with the base plate 20, the flap 22 or the load compartment floor 27. For positioning and navigation within the loading space, the sensors 10 can be read by the control system. Generally, the conveyor vehicle 1 will navigate so that it is centered on the load compartment floor 27 between the side walls of the trailer 25.

Figure 7:
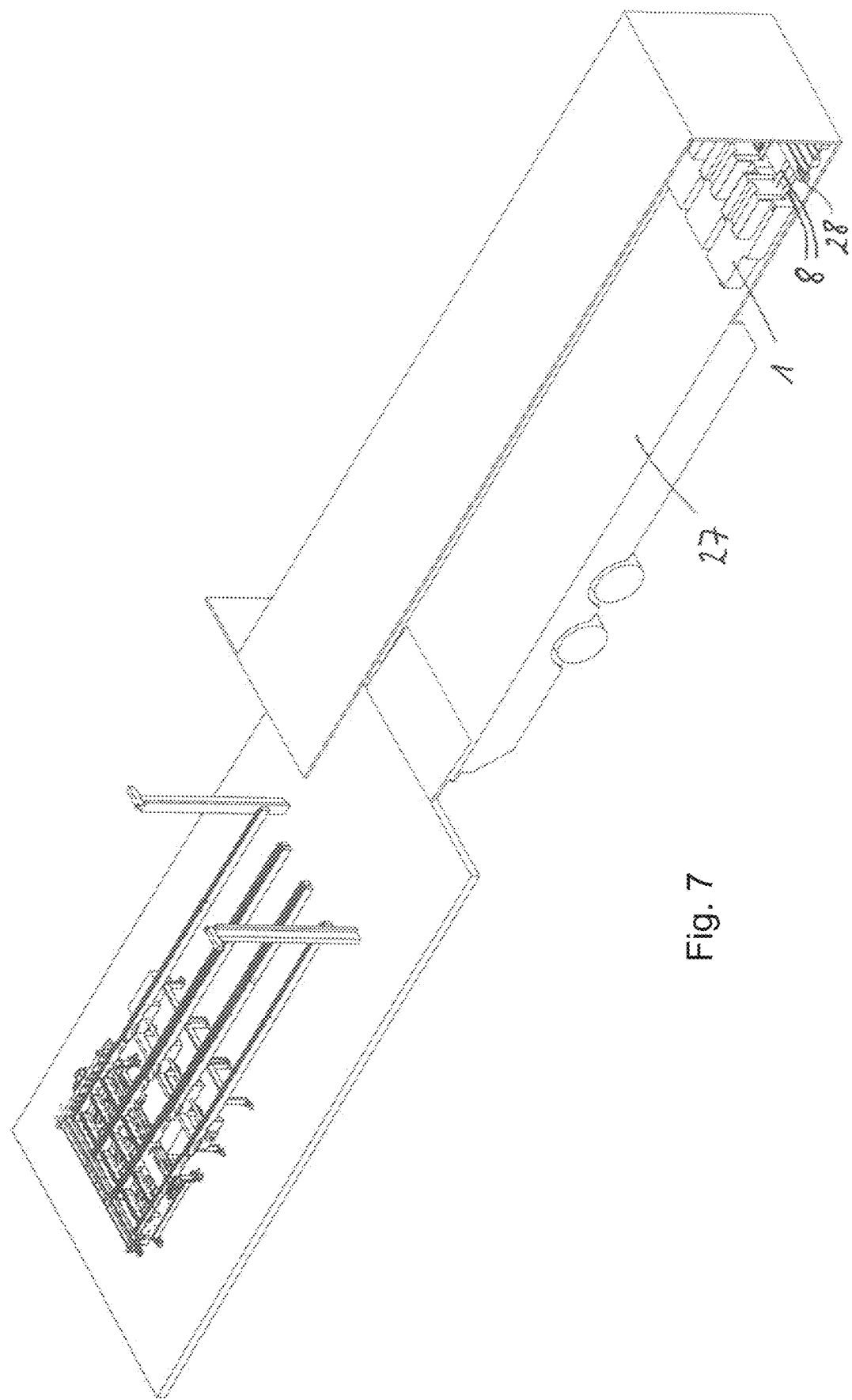
FIG. 7 shows the loading system shown in FIGS. 4 to 6, in which the conveyor vehicle with the pallets has driven all the way into the loading space of the trailer and deposited the pallets there.
Figure 8:
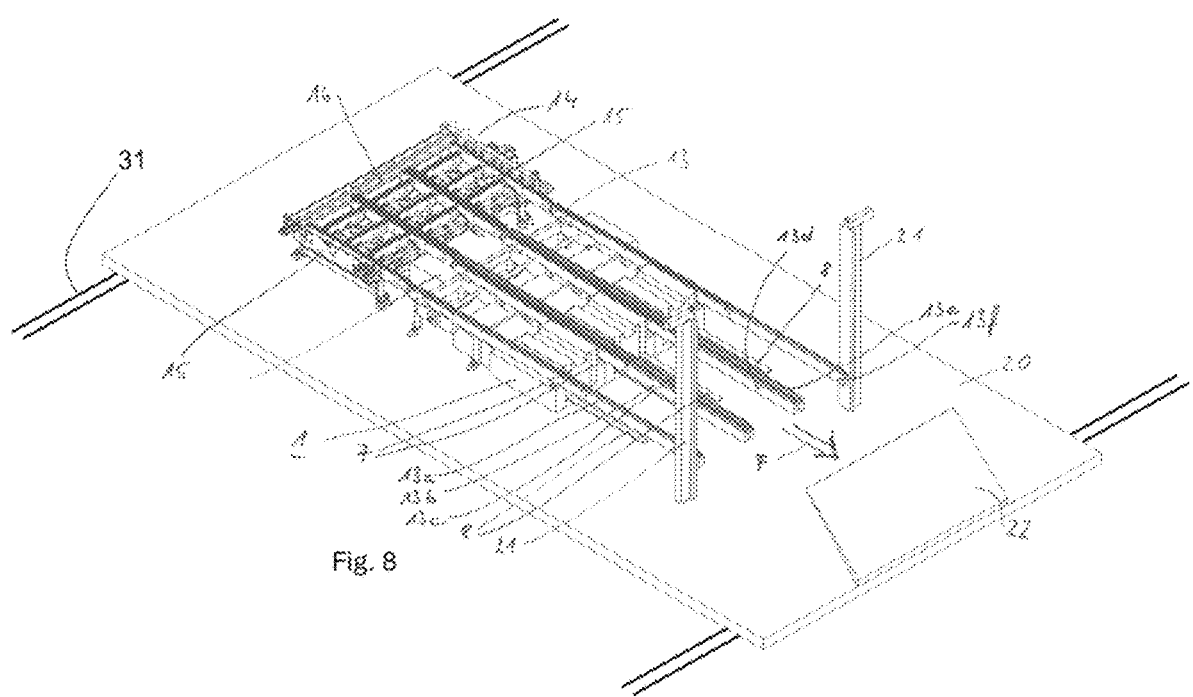
FIG. 8 shows the loading system shown in FIGS. 4 to 7, in which the base plate 20 is mounted on an example embodiment of rollers or a rail system 31.

With the pallet fork units 8 lowered, the conveyor vehicle 1 can now drive into the trailer 25 together with the pallets 28, namely to the end position shown in FIG. 7, in which the pallets 28 are then parked for further transport by lowering the pallet fork units 8 to such an extent that the pallets 28 then stand up on the loading space floor 27 and the pallet forks 8 can be pulled out of the openings when the conveyor vehicle 1 reverses. Without the pallets 28, the conveyor vehicle 1 can automatically reverse backward to the starting position against the conveying direction F.

Once the pallets 28 have been transferred from the feed area 14 to the chain conveyor 13, i.e. from about the position illustrated in FIG. 5, further pallets can be deposited on the feed area 14 until a new row of two pallets is formed. With this new row of pallets, the loading operation described with respect to FIGS. 4 to 7 then continues, with the conveyor vehicle 1 placing the new row of pallets on the loading area floor 27 of the trailer 25 in the conveying direction F immediately behind the rows of pallets 28 already located there. This continues until all pallets have been processed or the loading space of the semitrailer 25 is completely filled.

Unloading of a loaded semitrailer 25 is carried out analogously in reverse order. For this purpose, the conveyor vehicle 1 moves into the filled loading space of the trailer 25, lifts one row of pallets at a time and places them on the chain conveyor 13, from which the pallets are then moved in the opposite direction to the conveying direction F to the loading area 14, where they can be removed by a forklift truck.

The conveyor vehicle 1 can be charged via a corresponding electric coupling or an inductive charging device in the rest position illustrated in FIG. 3, between the respective trips and in particular also during waiting times between two loading operations.

With the new loading system, rows of two pallets can be moved in the transverse direction or three pallets in the longitudinal direction in the manner described, whereby when the orientation of the pallets is changed, only the positions of the second and fifth pallet forks need to be adjusted to fit, if this is necessary at all depending on the design of the pallets.

It is evident that the new loading system does not require any new installations in the trailer of the truck or in corresponding swap bodies or containers, but can also be used with standard vehicles. It can also be seen that the space required in the warehouse building in the ramp area is significantly less than with systems in which the entire load of usually 16×2 pallets in the transverse direction or 11×3 pallets in the longitudinal direction has to be positioned on a conveyor system and then conveyed overall into the loading space.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A loading system for loading and unloading cargo spaces of trucks, the loading system comprising:
   conveyors positioned parallel to each other and such that pallets can be moved back and forth on the conveyors in a conveying direction; and
   an autonomous conveyor vehicle including at least one steerable wheel; wherein
   the conveyors are positioned at a height above a floor such that below the conveyors, the conveyor vehicle with vertically movable pallet fork assemblies can be positioned; and
   the conveyor vehicle is able to fit below the conveyors in a manner where the conveyor vehicle does not project beyond the conveyors when the loading system is viewed from a vertical direction.

2. The loading system according to claim 1, wherein the conveyor vehicle includes at least two pallet fork assemblies each including two parallel and spaced pallet forks.

3. The loading system according to claim 1, wherein the conveyors protrude at least about 0.8 m beyond free ends of the pallet fork assemblies in the conveying direction when the conveyor vehicle is in a rest position below the conveyors.

4. The loading system according to claim 1, wherein a total of six parallel chain conveyors are provided such that adjacent pairs of the chain conveyors are spaced at a distance of 0.5 m to 0.7 m from one another.

5. The loading system according to claim 1, further comprising measuring columns with sensors to measure a loading space opening not belonging to the loading system.

6. The loading system according to claim 1, wherein the conveyor vehicle includes at least one drive, at least one lifter and a controller.

7. The loading system according to claim 1, wherein the conveyor vehicle includes sensors to assist with navigation within a loading space.

8. The loading system according to claim 7, wherein the conveyor vehicle includes an accumulator to supply power to the drive, the lifter and the controller, and the accumulator is electrically chargeable by an electrical coupling or inductively in the loading system.

9. The loading system according to claim 1, wherein the floor includes a base plate on which at least the feed area and the conveyors are mounted.

10. The loading system according to claim 9, wherein the base plate is mounted on rollers or on a rail system so as to be movable transversely to the conveying direction.

11. The loading system according to claim 1, wherein the at least one steerable wheel makes it possible for the autonomous conveyor vehicle to move in directions which are not parallel to the conveying direction.

12. The loading system according to claim 1, wherein the vertically movable pallet fork assemblies are able to remove the pallets from the conveyors by raising from a level which is vertically below the conveyors to a level which is vertically above the conveyors.

* * * * *